Oct. 18, 1955    G. R. L. SHEPHERD    2,721,225
PRODUCTION OF CYCLO-OLEFINS
Filed Oct. 16, 1952
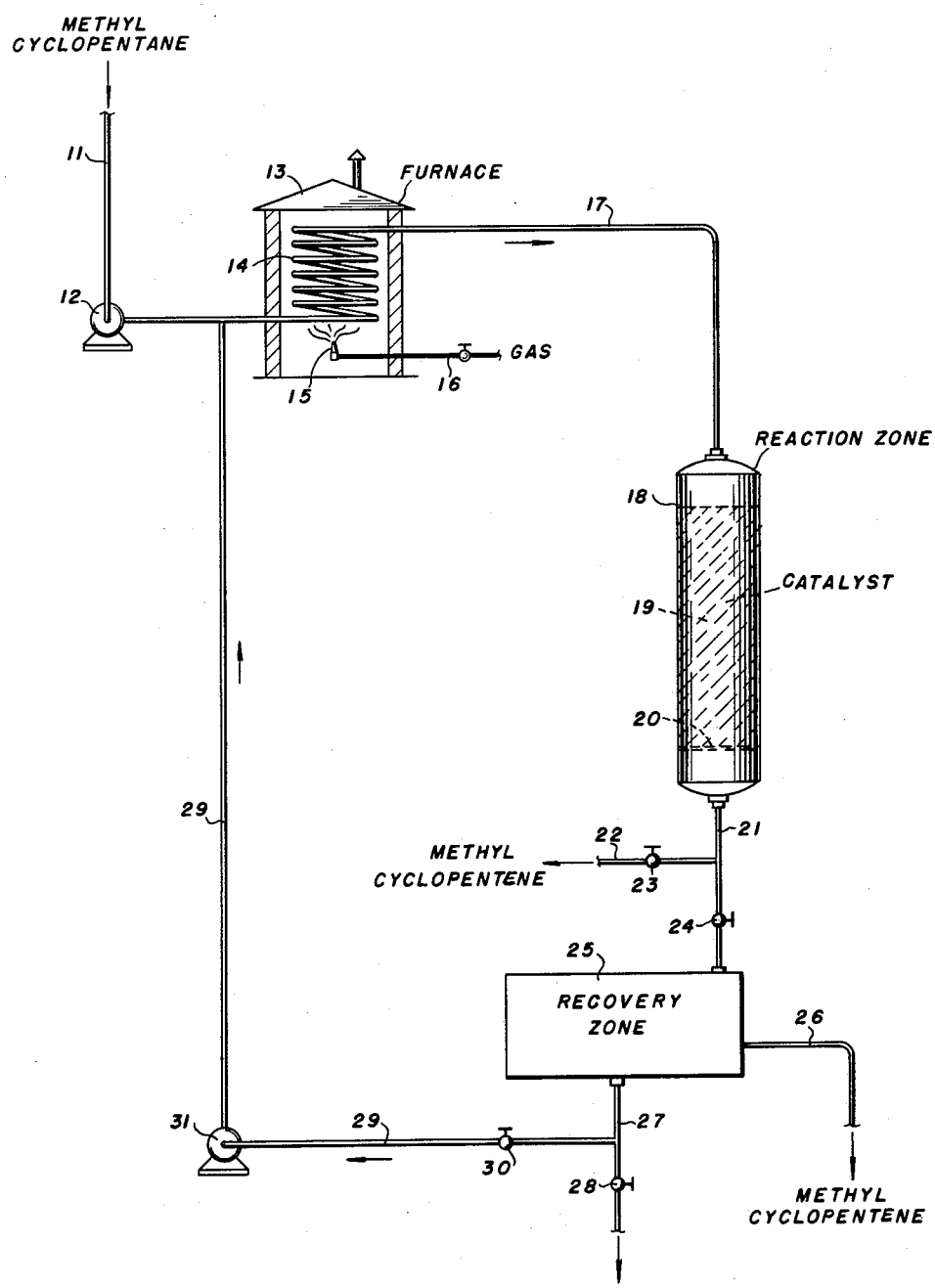
INVENTOR.
George R. L. Shepherd,
BY
AGENT.

United States Patent Office 2,721,225
Patented Oct. 18, 1955

2,721,225

PRODUCTION OF CYCLO-OLEFINS

George R. L. Shepherd, Baytown, Tex., assignor, by mesne assignments, to Esso Research and Engineering Company, Elizabeth, N. J., a corporation of Delaware Application October 16, 1952, Serial No. 315,127

7 Claims. (Cl. 260—666)

The present invention is directed to a method for producing cyclo-olefins. More particularly, the invention is directed to a method for producing a cyclo-mono-olefin having 5 carbon atoms in a ring. In its more particular aspects, the invention is directed to the production of methylcyclopentene.

The present invention may be briefly described as involving the contacting of a naphthenic hydrocarbon, such as methylcyclopentane, with an activated carbon catalyst at a temperature in the range between 850° and 1150° F. and at a pressure in the range from 0 to 400 pounds per square inch for a time sufficient to form a product containing a substantial amount of cyclo-olefin. The cyclo-olefin may then be recovered from the product and the unreacted material recycled to the contacting step.

The naphthenic hydrocarbon employed as the feed stock of the present invention may be cyclopentane, methylcyclopentane, or other homologues of cyclopentane; mixtures containing methylcyclopentane and the like may be used. The feed stocks to my process may suitably be a hydrocarbon fraction such as a petroleum fraction boiling in the range between 100° to 265° F. which contains cyclopentane or methylcyclopentane and homologues thereof. As examples thereof may be mentioned the dimethylcyclopentanes, ethylcyclopentane, trimethylcyclopentanes and propylcyclopentanes. The hydrocarbon fraction may suitably be obtained from selected crude petroleum or it may be obtained from conversion operations.

The catalyst employed in my invention is an activated carbon catalyst selected from the numerous activated carbons available on the market. For example, the activated carbon may be prepared from various raw materials, such as cane sugar, kelp, bagasse, coal, lignite, peat, sawdust, charcoal, rice hulls, corn cobs, molasses, carbonized sulfuric acid sludge resulting from the acid treatment of petroleum products, carbonized materials from cellulose manufacture, bone, and even from blood. Activated bituminous carbon, activated coconut charcoal, or petroleum coke, are preferred activated carbons. As to reference to methods of activation, a description thereof may be found in Hassler's "Active Carbon, The Modern Purifier," Githens-Sohl Corporation, New York, copyright, 1941 by Industrial Chemical Sales Division, West Virginia Pulp and Paper Company.

The particle size of the activated carbon employed in the present invention may be in the range between 4 and 300 mesh; however, the particle size will depend on the mode of operation employed for the practice of my invention since the invention may be employed with the activated carbon either in a fixed bed, a moving bed or in a fluidized type of operation. In the latter type of operation the activated carbon may be suspended in the heated vaporous hydrocarbons and the particle sizes will suitably be in the range from 50 to 250 microns.

It is contemplated that the activated carbon may be suitably promoted with a potassium compound such as oxide, hydroxide, or carbonates thereof. The activated carbon, from time to time, may become fouled due to deposition of coke-like material and heavy polymers thereon. The potassium compound promotes the removal of such materials as will be described hereinafter.

The temperatures to be employed in my process are temperatures from about 850° to about 1150° F. with good results being obtained at about 990° F.

Pressures may range from about 0 pounds per square inch gauge to 400 pounds per square inch gauge with a preferred pressure range of from 0 to 100 pounds per square inch gauge. Goods results are obtained at atmospheric pressure.

The naphthenichydrocarbon feed containing methylcyclopentane and the like should be contacted with the catalyst at a space velocity in the range from about 0.1 to 8.0 volumes of feed per volume of catalyst per hour. Preferred space velocities are in the range from 0.2 to 5.0 v./v./hour with good results being obtained at about 1.0 v./v./hour.

The employment of hydrogen may be beneficial in the practice of my invention. Under some conditions it may be desirable not to employ hydrogen. When hydrogen is used an amount in the range from 0.1 to 4 moles of hydrogen per mole of feed; about 2 moles of hydrogen per mole of hydrocarbon feed may result in the production of substantial amounts of olefins at the conditions named.

The invention will be further illustrated by reference to the drawing in which the single figure is a flow diagram of a preferred mode.

Referring to the drawing, numeral 11 designates a flow line through which a naphthenic hydrocarbon feed, such as methylcyclopentane is introduced into the system from a source not shown. Line 11 contains a pump 12 which serves to discharge the feed into a furnace 13 provided with a heating coil 14. Furnace 13 has a gas burner or burners 15 which are suitably provided with fuel gas through line 16 which serve to raise the temperatures of the feed to a temperature in the range given before. The heated feed issues from coil 14 in furnace 13 by line 17 and is discharged thereby into a reaction zone 18 in which is arranged a body of activated carbon catalyst 19 designated by the shaded portion and arranged on a grid plate 20. The heated methylcyclopentane passes downwardly through the catalyst 19 and on passage therethrough and in contact with the catalyst is converted into a product containing a substantial amount of methylcyclopentene. Although only one catalyst reaction zone 18 is shown, it will be desirable to provide a plurality of such zones. Thus, one zone will be on a reaction cycle for a time from about 4 to 8 hours and another reaction zone will be on a regeneration cycle wherein the catalyst is regenerated by heating to a temperature in the range between 1100° and 1400° F. in the presence of steam. Actually, it may be unnecessary to provide extraneous heat for the regeneration or steaming operation.

The product is withdrawn from reaction zone 18 through line 21 and may be withdrawn from the system by branch line 22 controlled by valve 23 for further processing as may be desired. Preferably, however, valve 23 in line 22 is allowed to remain closed and valve 24 in line 21 is in the open position and the methylcyclopentene-containing product is discharged by line 21 into a recovery zone 25 for separation of the methylcyclopentene from the unreacted methylcyclopentane and other hydrocarbons boiling in the range given which may be present in the feed.

The recovery zone 25 may be a suitable sulfuric acid treating zone in which the methylcyclopentene is caused to react with sulfuric acid and to form a sulfated product which on suitable treatment, such as by hydrolysis and subsequent dehydration of the alcohol, will allow recovery of the methylcyclopentene in a purified condition. The recovery zone 25 may also be an adsorption zone, such as one containing activated chars, such as coconut charcoal and the like such as employed as the catalyst, or one containing silica gel.

It is contemplated in the practice of my invention that the activated carbon, after it has been regenerated such as with steam as described hereinbefore, may suitably be used as an adsorption agent for recovering the cyclo-olefin from the unreacted hydrocarbons. Thus, it is specifically contemplated in my invention that one or more reactors containing activated carbon catalyst may be onstream in forming the cyclo-olefins while one or more other reactors containing activated carbon which has been regenerated in the manner described hereinbefore may be used in the recovering or adsorption operation. After the reactor containing activated carbon has lost its utility as a catalyst because of contamination by coke or polymers, it may then be regenerated by steam as previously described and the catalyst which has been employed as an adsorption agent may be subsequently used in the reaction zone.

In any event, if the recovery zone 25 is an adsorption system provision will be made to separate the methylcyclopentene from the unreacted hydrocarbons, the methylcyclopentene being more strongly adsorbed on the adsorptive agent, such as activated carbon, than the methylcyclopentane and may thus be recovered by use of a suitable desorbing liquid, for example, an aromatic hydrocarbon of different boiling range or an alcohol or any of the well-known desorbing liquids. In any event, regardless of what type of recovery operation is used in zone 25 there is recovered from zone 25 a methylcyclopentene stream which is discharged by line 26 which suitably may be used as a starting point in chemical synthesis. The unreacted hydrocarbons separated from the methylcyclopentene may suitably be discharged from the system by line 27 on opening valve 28 therein. Preferably, however, the stream withdrawn by line 27 is recycled by line 29 controlled by valve 30 to line 11 for reuse in the process. Pump 31 is provided in line 29 for recycling the stream withdrawn by line 27 from zone 25.

It will be seen from the foregoing description taken with the drawing that my process involves relatively few operations, specifically a heating step, a contacting operation and a separation operation when it is desired to recover a substantially pure cyclo-olefin.

The invention will be further illustrated by the following example in which pure methylcyclopentane was passed over an activated bituminous carbon catalyst for a period of four hours at 994° F., atmospheric pressure, and a space velocity of 1.33 volumes of feed per volume of catalyst per hour. As a result of this operation a product was obtained which contained 10.1% by volume based on the feed of olefins and particularly methylcyclopentene. The product contained toluene and benzene as well as unreacted feed. Carbon production was indicated to be about 2%. The product is suitable for use in motor fuels.

The nature and objects of the present invention having been completely described and illustrated, what I wish to claim as new and useful and to secure by Letters Patent is:

1. A method for producing a cyclo-olefin which comprises contacting a naphthenic hydrocarbon selected from the class consisting of cyclopentane and its homologues containing a cyclopentane ring boiling in the range between 100° and 265° F. with a catalyst consisting of activated carbon at a temperature in the range between 850° and 1150° F. and at a pressure not in excess of 400 pounds per square inch gauge for a time sufficient to form a product containing a substantial amount of a cyclo-olefin, and recovering said cyclo-olefin.

2. A method for producing a cyclo-mono-olefin which comprises contacting a naphthene hydrocarbon selected from the class consisting of cyclo-pentane and its homologues containing a cyclopentane boiling in the range between 100° and 265° F. with a catalyst consisting of activated carbon at a temperature in the range between 850° and 1150° F. and at a pressure in the range from 0 to 400 pounds per square inch gauge, at a space velocity in the range from 0.1 to 8.0 volumes of feed per volume of catalyst per hour to produce a product containing a substantial amount of cyclo-mono-olefin and recovering said cyclo-mono-olefin.

3. A method in accordance with claim 2 in which the activated carbon is activated bituminous carbon.

4. A method for producing a cyclo-mono-olefin which comprises contacting a naphthene hydrocarbon selected from the class consisting of cyclopentane and its homologues containing a cyclopentane ring boiling in the range between 100° and 265° F. with a catalyst consisting of activated bituminous carbon at a temperature of about 990° F., at about atmospheric pressure and at a space velocity of about 1.3 volumes of feed per volume of catalyst per hour to produce a product containing a substantial amount of cyclo-mono-olefin and recovering said cyclo-mono-olefin.

5. A method for producing a cyclo-mono-olefin which comprises contacting a naphthenic hydrocarbon selected from the class consisting of cyclopentane, methylcyclopentane, dimethylcyclopentanes, ethylcyclopentane, trimethylcyclopentanes, and propylcyclopentanes with a catalyst consisting of activated carbon at a temperature in the range between 850° and 1100° F. and at a pressure of from 0 to 400 pounds per square inch gauge and a space velocity of 0.1 to 8 volumes of feed per volume of catalyst per hour to produce a product containing a substantial amount of cyclo-mono-olefin, and recovering said cyclo-mono-olefin.

6. A method for producing a cyclo-olefin which comprises contacting a naphthenic hydrocarbon selected from the class consisting of cyclopentane and its homologues containing a cyclopentane ring boiling in the range between 100° and 265° F. with a body catalyst consisting of activated carbon at a temperature in the range between 850° and 1150° F. and at a pressure not in excess of 400 pounds per square inch gauge for a time sufficient to form a product containing a substantial amount of cyclo-olefin until said catalyst loses its utility as a catalyst, regenerating said catalyst by steaming, and then recovering said cyclo-olefin by adsorbing same on said regenerated catalyst.

7. A method in accordance with claim 6 in which the naphthenic hydrocarbon is again contacted with the regenerated catalyst for producing said cyclo-olefin after use of the regenerated catalyst to adsorb said cyclo-olefin from the product.

References Cited in the file of this patent

UNITED STATES PATENTS

| | | |
|---|---|---|
| 1,881,692 | Krauch et al. | Oct. 11, 1932 |
| 2,183,574 | Levine et al. | Dec. 19, 1939 |
| 2,593,446 | Voge et al. | Oct. 25, 1949 |
| 2,412,936 | Hepp | Dec. 17, 1946 |
| 2,485,965 | Voge et al. | Oct. 25, 1949 |
| 2,593,446 | Heinemann | Apr. 22, 1952 |

OTHER REFERENCES

Berkman et al., "Catalysis," Reinhold Publ. Corp., pages 891–894, 330 W. 42nd St., N. Y. (1940).